(12) United States Patent
Sousa

(10) Patent No.: US 6,452,623 B2
(45) Date of Patent: Sep. 17, 2002

(54) MULTIPLE-BEAM, DIODE-PUMPED IMAGING SYSTEM

(75) Inventor: John Gary Sousa, Hudson, NH (US)

(73) Assignee: Presstek, Hudson, NH (US)

( * ) Notice: Subject to any disclaimer, the term of this patent is extended or adjusted under 35 U.S.C. 154(b) by 0 days.

(21) Appl. No.: 09/839,506

(22) Filed: Apr. 20, 2001

Related U.S. Application Data

(62) Division of application No. 09/245,102, filed on Jan. 26, 1999, now Pat. No. 6,222,577.

(51) Int. Cl.⁷ .............................................. B41J 27/00
(52) U.S. Cl. ........................................ 347/256; 347/241
(58) Field of Search ................................ 347/234, 241, 347/244, 242, 256, 257, 258; 385/25, 32, 52, 88, 92, 93, 14, 60, 80, 94

(56) References Cited

U.S. PATENT DOCUMENTS

| 4,615,581 | A | * | 10/1986 | Morimoto | 385/60 |
|---|---|---|---|---|---|
| 5,385,092 | A | | 1/1995 | Lewis et al. | 101/467 |
| 5,521,999 | A | * | 5/1996 | Chuang et al. | 385/88 |
| 5,883,988 | A | * | 3/1999 | Yamamoto et al. | 385/14 |
| 5,930,430 | A | * | 7/1999 | Pan et al. | 385/94 |
| 5,990,925 | A | * | 11/1999 | Sousa et al. | 347/256 |
| 6,222,577 | B1 | * | 4/2001 | Sousa | 347/234 |
| 6,257,773 | B1 | * | 7/2001 | Moriyama et al. | 385/92 |

FOREIGN PATENT DOCUMENTS

| EP | 0541460 A2 | 5/1993 |
|---|---|---|
| EP | 0694408 A1 | 1/1996 |
| EP | 0783223 A2 | 7/1997 |
| WO | WO 95/05944 | 3/1995 |

* cited by examiner

*Primary Examiner*—Hai Pham
(74) *Attorney, Agent, or Firm*—Testa, Hurwitz & Thibeault, LLP

(57) ABSTRACT

A single laser crystal is driven with multiple pumping sources to obtain discrete, collimated outputs without substantial thermal crosstalk, so that the action of one pumping source does not adversely interfere with the action of another source driving the same crystal; that is, an imaging output emanating from one crystal region will neither defeat nor spuriously cause an imaging output in another region.

2 Claims, 4 Drawing Sheets

MULTIPLE-BEAM, DIODE-PUMPED IMAGING SYSTEM

CROSS-REFERENCE TO RELATED APPLICATION

This is a division of U.S. patent application Ser. No. 09/245,102, filed Jan. 26, 1999, now U.S. Pat. No. 6,222,577 the entirety of which is hereby incorporated by reference.

BACKGROUND OF THE INVENTION

1. Field of the Invention

The present invention relates to digital printing apparatus and methods, and more particularly to a system for imaging of recording media such as lithographic printing members.

2. Description of the Related Art

Imaging devices that utilize laser power sources frequently deliver the output of the laser to its destination using an optical fiber arrangement. this frees the designer from the need to physically locate the lasers directly adjacent the recording medium. For example, U.S. Pat. Nos. 5,351,617 and 5,385,092 (the entire disclosures of which are hereby incorporated by reference) disclose the use of lasers to impress images onto lithographic printing-plate constructions. As described in these patents, laser output can be generated remotely and brought to the recording blank by means of optical fibers and focusing lens assemblies.

It is important, when focusing radiation onto many types of recording medium, to maintain satisfactory depth-of-focus—that is, a tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that can accompany normal use. Depth-of-focus is maximized by keeping output beam divergence to a minimum.

Optical efforts to reduce beam divergence also diminish power density, since a lens cannot alter the brightness of the radiation it corrects; a lens can only change the optical path.

Thus, optical correction presents an inherent tradeoff between depth-of-focus and power loss. U.S. Pat. No. 5,822,345 discloses an approach that utilizes the divergent output of a semiconductor or diode laser to optically pump a laser crystal, which itself emits laser radiation with substantially less beam divergence but comparable power density; the laser crystal converts divergent incoming radiation into a single-mode output with higher brightness. The output of the laser crystal is focused onto the surface of a recording medium to perform the imaging function.

The arrangements described in the '345 patent employ a separate crystal for each diode pumping source. This is ordinarily necessary due to the nature of laser crystals and their operation. In the absence of optical excitation, resonant cavities formed from these optical-gain crystals are flat-flat monoliths; when optical power is delivered to an end face of such a crystal, however, this and the opposed face bow—an effect called bulk thermal lensing. To obtain a single transverse mode of operation (preferably the lowest-order, fundamental $TEM_{00}$ mode), with the output divergence as close as possible to that of a diffraction-limited source, the crystal must be implemented in a design that accounts for bulk thermal lensing.

This phenomenon makes it even more difficult to obtain multiple, independent outputs from a single laser crystal. Even if the energy of each pumping source is confined to a discrete region on one of the crystal faces, the thermal lensing action required for lasing in one region will ordinarily affect the other regions, resulting in mutual interference. This condition is known as "thermal crosstalk." Accordingly, the current state of the art prescribes the use of a separate crystal for each laser channel, resulting not only in added cost for the crystals and their mounts, but also for separate focusing assemblies.

In addition, the configurations described in the '617 and '092 patents (and, somewhat more pertinently, in U.S. Pat. No. 5,764,274) contemplate permanent affixation of the diode laser packages to the optical fiber. This is due to the need for efficient coupling of the laser energy into the end face of the fiber. Components are therefore permanently joined so that the alignment therebetween remains undisturbed during operation. Should a diode fail, not only the diode but the entire optical-fiber assembly must be replaced. Such a requirement is of little consequence in the arrangements described in the '274 patent, since the the fiber is coupled to a focusing assembly using an SMA connector or the like, which is conveniently removed and replaced. In arrangements having fiber outputs that are less accessible or which require more involved mounting operations, however, permanent diode affixation at the input side of the optical fiber can prove decidedly disadvantageous.

DESCRIPTION OF THE INVENTION

Brief Summary of the Invention

In a first aspect, the invention confers the ability to drive a single laser crystal with multiple pumping sources to obtain discrete, collimated outputs without substantial thermal crosstalk. The meaning of the term "substantial thermal crosstalk" as used herein must be understood in terms of the imaging context. Basically, it means that the action of one pumping source will not adversely interfere with the action of another source driving the same crystal; that is, an imaging output emanating from one crystal region will neither defeat nor spuriously cause an imaging output in another region. Exactly what constitutes an "imaging output" also depends on the application. In a lithography environment, an "imaging output" produces an image spot on the printing plate that alters the affinity of the plate for ink or a fluid to which ink will not adhere (depending on the nature of the plate). Thus, even if the laser output has some physical effect on the plate, it is not an "imaging output" unless that effect translates into lithographically functional results when the plate is used. As a consequence, minor thermal crosstalk that does not rise to the level of an imaging output (or its defeat) does not qualify as "substantial thermal crosstalk."

In accordance with this aspect of the invention, measures are taken to confine the heat associated with thermal lensing to specific crystal regions, as well as to isolate these regions thermomechanically to the highest extent possible. Thus, in one embodiment, the anterior face of the laser crystal (i.e., the side facing the pumping sources) is provided with a series of parallel grooves and a pair of spaced-apart metal strips extending across the anterior face of the crystal perpendicular to the grooves. The strips and grooves serve to isolate thermomechanically the regions they define, and are aligned with the pumping sources such that the pumping-source outputs strike the anterior crystal face in the centers of the regions bounded by the strips and the grooves.

This type of configuration may involve permanent mounting of the fibers that conduct the pumping energy to the crystal. Accordingly, in a second aspect, the invention provides for removable affixation of the pumping laser diodes at the input ends of the fibers. In one embodiment, this is accomplished using a sapphire window and a mount that places the (input) end face of the fiber against the window. In another embodiment, pumping laser output is coupled into a fiber whose other end face is butted against the anterior face of the crystal.

For example, a suitable arrangement includes a laser diode; a microlens associated with the laser diode (e.g., permanently adhered to the diode output slit); a sapphire window, one side of which is associated with the microlens (e.g., permanently adhered to the lens opposite the diode slit); and a mount for removably receiving the optical fiber such that an end face thereof makes contact with the free face of the sapphire window, creating a continuous light path extending from the laser diode to the end face of the fiber. A suitable mount, adapted for an optical fiber carried in a connector comprising a threaded collar coaxially surrounding the fiber (e.g., an SMA connector), may include a tubular stem having exterior threads for receiving the collar and a bore for receiving the fiber therethrough. The sapphire window is positioned at the rear of the mount, and the relationship of elements within the mount is based on the distance the fiber protrudes into or beyond the connector—ensuring that when the connector is attached, the end face of the fiber will reliably make contact with the free face of the sapphire window.

In a third aspect, the invention exploits the structure of a typical array of imaging devices to reduce imaging artifacts. This aspect of the invention pertains to any series of imaging outputs organized into one or more groups (each consisting, for example, of a multiply pumped laser crystal producing multiple outputs) and focused onto a rotating drum. Each time the drum rotates, each output of a group produces a column or "swath" of image points (in accordance with data corresponding to the image to be applied); the distance between adjacent swaths corresponds to the image resolution, and the outputs are indexed by this amount to begin their next swaths each time the drum finishes rotating. The invention makes use of variable indexing to disrupt the periodicity of visible artifacts associated with a particular output, thereby reducing their visual impact. Specifically, the outputs of each group of laser crystals are first indexed by the resolution distance until the regions between the adjacent output beams within each group have been fully scanned. Then, after each group is indexed by the much larger distance between the first and last outputs of a group (or, expressed with respect to a recording medium on the drum, by the axial width of the imaging zone spanned by the group of outputs), each group is again indexed by the resolution distance as before. This process is continued until all unimaged regions between neighboring groups are fully scanned.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
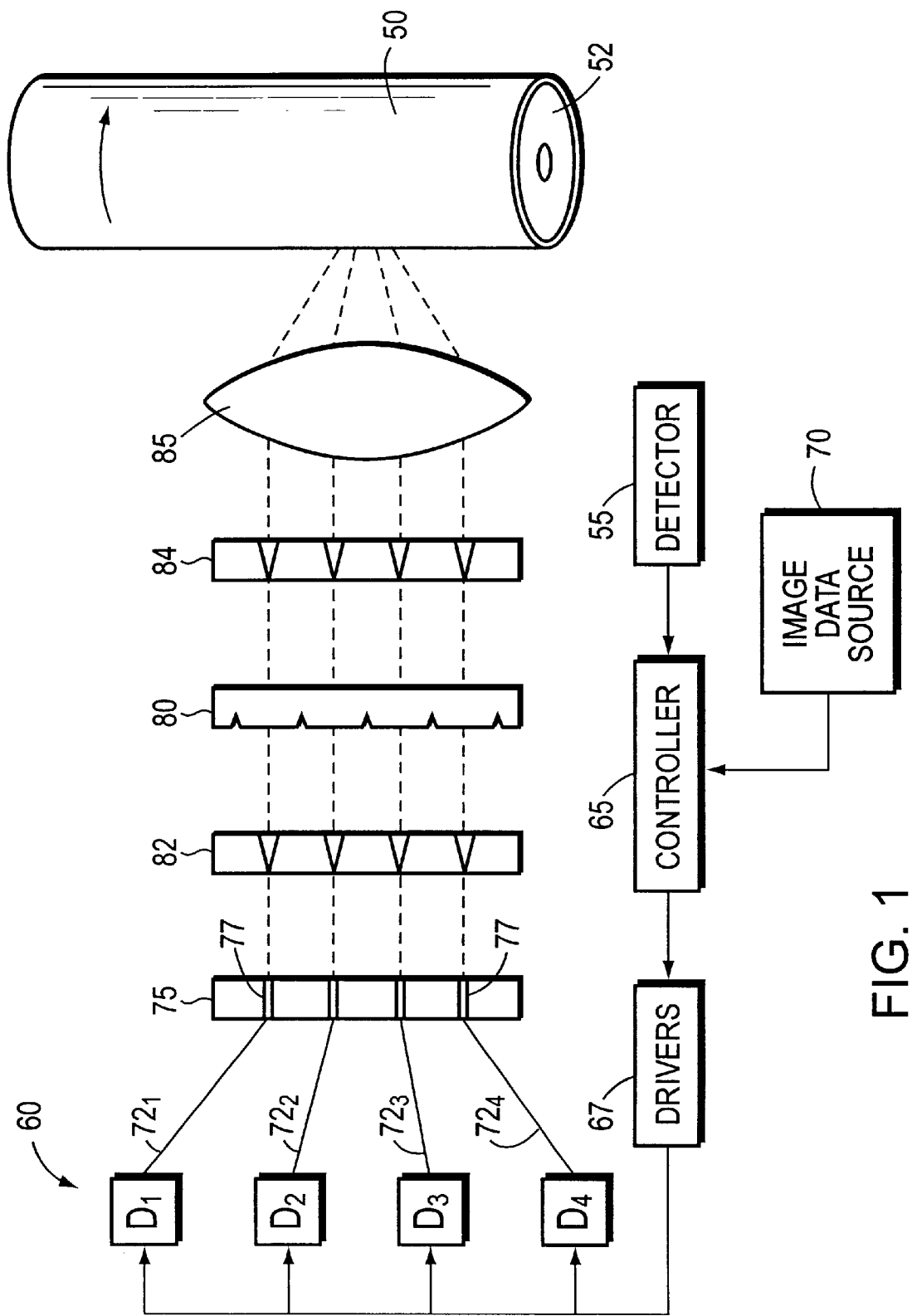
FIG. 1 is a plan schematic illustration of the basic components of the invention in a representative implementation.

Refer first to FIG. 1, which schematically illustrates the basic components of the invention. A recording medium 50, such as a lithographic plate blank or other graphic-arts construction, is affixed to a support during the imaging process. In the depicted implementation, that support is a cylinder 52 around which recording medium 50 is wrapped, and which rotates as indicated by the arrow. If desired, cylinder 52 may be straightforwardly incorporated into the design of a conventional lithographic press, serving as the plate cylinder of the press. cylinder 52 is supported in a frame and rotated by a standard electric motor or other conventional means. The angular position of cylinder 52 is monitored by a shaft encoder associated with a detector 55. The optical components of the invention, described hereinbelow, may be mounted in a writing head for movement on a lead screw and guide bar assembly that traverses recording medium 50 as cylinder 52 rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with a series of pumping laser diodes 60, four of which are representatively designated $D_1$, $D_2$, $D_3$, $D_4$. The optical components discussed below concentrate laser output onto recording medium 50 as small features, resulting in high effective power densities. A controller 65 operates a series of laser drivers collectively indicated at 67 (and described more fully below) to produce imaging bursts when the outputs of the lasers 60 are directed at appropriate points opposite recording medium 50.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of the focused outputs of lasers 60 and recording medium 50 (as reported by detector 55) with the image data to actuate the appropriate laser drivers at the appropriate times during scan of recording medium 50. The driver and control circuitry required to implement this scheme is well-known in the scanner and plotter art; suitable designs are described in the '092 patent and in U.S. Pat. No. 5,174,205, both commonly owned with the present application and hereby incorporated by reference.

The output of each of the lasers 60 is conducted, by means of an optical fiber $72_1$, $72_2$, $72_3$, $72_4$, to an alignment bench 75 that has a.series of parallel grooves 77 for receiving the fibers. Bench 75, which may be fabricated from materials such as metal or silicon, is aligned with a laser crystal to direct the outputs of lasers 60 at appropriate points on the anterior face 80f of laser crystal 80. Because of the construction of laser crystal 80 as described below, each laser 60 stimulates a separate output from laser crystal 80 without substantial thermal crosstalk.

It is the emissions of crystal 80 that actually reach the recording medium 50. A first lenslet array 82 concentrates the outputs of lasers D₁–D₄ onto crystal 80, and a second lenslet array 84 concentrates the outputs from crystal 80 onto a focusing lens 85. The latter lens, in turn, demagnifies the incident beams in order to concentrate them further and draw them closer together on the surface of recording medium 50. The relationship between the initial pitch or spacing P between beams from crystal 80 and their final spacing on recording medium 50 is given by $P_f = P/D$, where $P_f$ is the final spacing and D is the demagnification ratio of lens 85. For example, the grooves 77 of bench 75 may be spaced 400 μm apart, which also determines the pitch P. If the demagnification ratio of lens 85 is 4:1, then the spots will be spaced 100 μm apart on the surface of recording medium 50.

Given the characteristics of currently available laser crystals, four pumping sources per crystal is a preferred configuration. Different configurations are of course possible, however. Most commercial imaging applications will require more than four simultaneously actuable laser beams. One may therefore employ a writing head having multiple crystals (each receiving, for example, four pumping inputs) focused through the same or separate optical components 82, 85 and all advanced by the same lead screw. The use of a series of multiply pumped laser crystals is also favored in order to minimize imaging artifacts, as described below.

A variety of laser crystals can serve in the present invention so long as they lase efficiently at the desired imaging wavelength and produce a collimated output. Preferred crystals are doped with a rare earth element, generally neodymium (Nd), and include Nd:YVO₄, Nd:YLF and Nd:YAG crystals. It should be understood, however, that advantageous results may be obtainable with other laser crystals.

Figure 2:
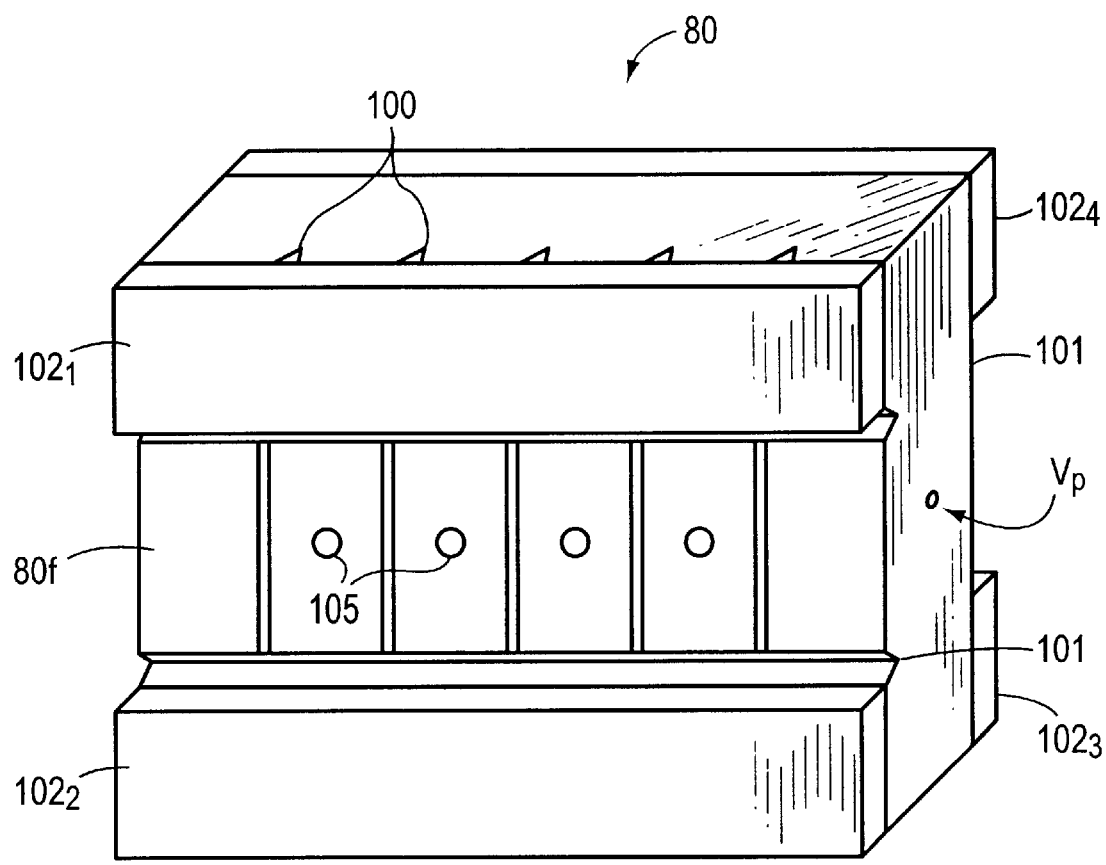
FIG. 2 is an isometric view of a crystal adapted to receive four separate inputs without substantial crosstalk.

With reference to FIG. 2, laser crystal 80 is modified in order to receive energy from multiple pumping sources and to provide, in response thereto, discrete outputs without substantial thermal crosstalk. Crystal 80 has a series of parallel longitudinal grooves 100 and transverse grooves 101 cut into end face 80*f*. Grooves 100, 101 may be, for example, 2–10 μm deep and spaced 100 μm apart. (Typically, crystal 80 is 0.5–2.0 mm thick, with a polarization vector $V_P$ oriented as shown.)

A pair of metal strips 102₁, 102₂ extend across face 80*f* of crystal 80 parallel to grooves 101; a complementary pair of metal strips 102₃, 102₄ extend across the posterior face of crystal 80. Metals strips 102 may be, for example, gold, 0.8 μm in height and 0.005 μm thick, and may be applied by vacuum deposition or other suitable means. Their purpose is to thermally couple the contacted regions of crystal 80 to a heat sinking arrangement (such as that disclosed in copending application Ser. No. 08/966,492, filed Nov. 7, 1997, the entire disclosure of which is hereby incorporated by reference).

Grooves 100, 101 define a series of four bounded regions. The outputs of the pumping lasers are desirably directed at the centerpoints 105 of these regions. In response, crystal 80 will produce four separate outputs without substantial thermal crosstalk.

The grouped structure of the laser diodes is advantageously employed to minimize imaging artifacts. These tend to occur at the boundaries between zones imaged by adjacent imaging devices, and reflect slight imperfections in inter-device spacings. The visual effect of these imperfections can be reduced or eliminated by exploiting the inter-device spacing within each array and the spacing between arrays to permit indexing by different amounts. Variable indexing disrupts the periodicity of imaging errors, making them less noticeable.

Suppose, for example, that the array shown in FIG. 1 is one of several arrays in a single writing head, that the pitch P in each array is 400 μm, and that the demagnification ratio of lens 85 is 4:1 to produce spots spaced 100 μm apart on the surface of recording medium 50. Suppose, further, that the desired dot resolution (i.e, the spacing between adjacent dots on recording medium 50) is 20 μm. Each time cylinder 52 rotates, each of the four diodes 60 produces a column or "swath" of image points. After a rotation, the array is indexed by 20 μm (the resolution or "spot-pitch" distance); and after the array has been indexed four times (so that four columns spaced 20 μm apart have been applied), the entire zone spanned by the array has been imaged. The writing head is then indexed by 300 μm, the distance representing the width of the imaging zone. Since the spacing between arrays ordinarily is substantially larger than the zone width, each array will be indexed through multiple zone widths throughout the course of a scan. Because of this variable indexing (i.e., at both the resolution and zone-width distances), imaging errors will generally be less noticeable as compared with, for example, a system in which the devices are indexed only by the resolution distance.

Figure 3:
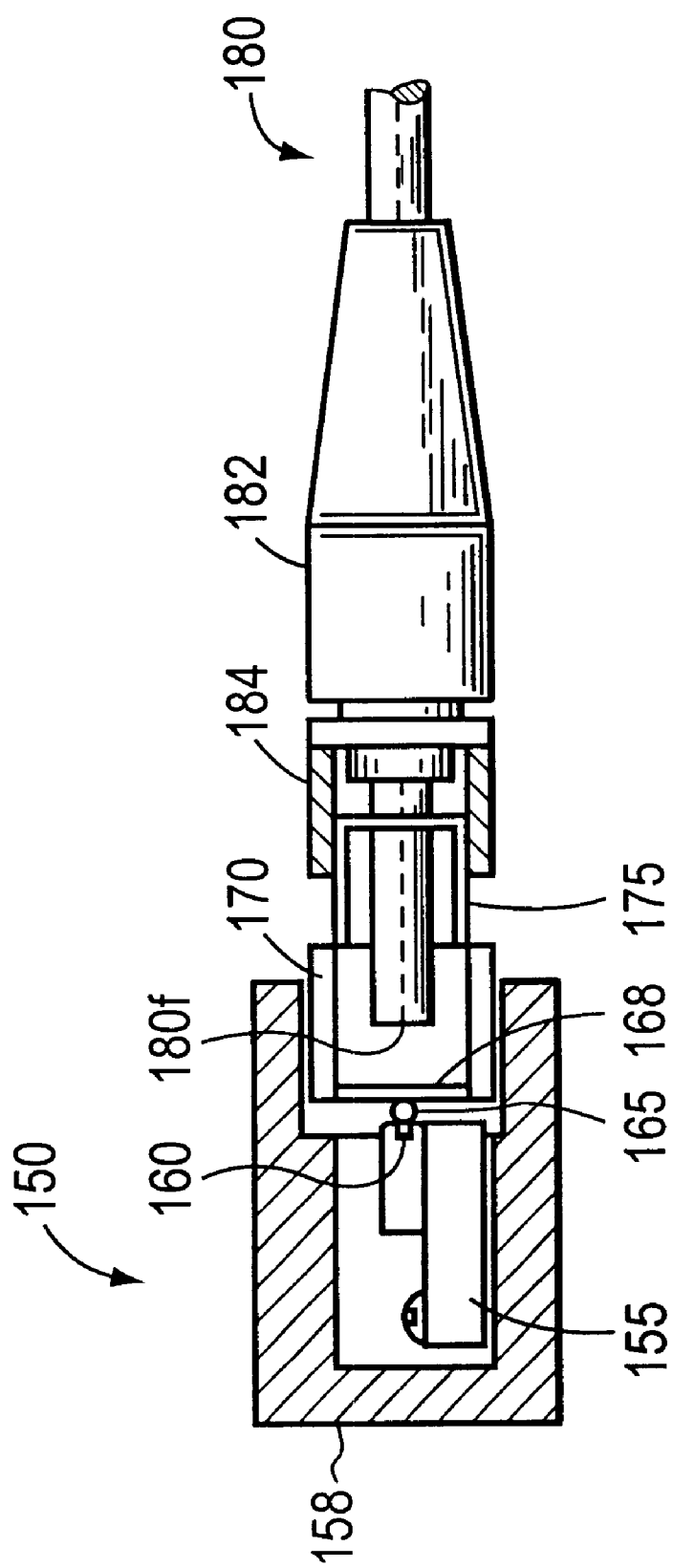
FIG. 3 is a sectional view of a first structure for removably coupling an optical fiber to a laser pumping diode, with the fiber partially inserted into the structure.

FIG. 3 illustrates a first mounting structure facilitating removable coupling of any of laser diodes D₁–D₄ to its respective fiber 72₁–72₄ (see FIG. 1). The structure, indicated generally at 150, guides the output of a laser diode 155 into the end face of an optical fiber without the need for permanent affixation thereto. Mounting structure 150 includes a housing 158 having an interior cavity for receiving the diode package 155, which is permanently affixed therein. Housing 158 contains suitable openings, not shown, that facilitate electrical connection to diode 155.

Diode 155 has an emission slit 160 through which laser radiation is emitted. Radiation disperses as it exits slit 160, diverging at the slit edges. Generally the dispersion (expressed as a "numerical aperture," or NA) along the short or "fast" axis is of primary concern; this dispersion is reduced using a divergence-reduction lens 165. A preferred configuration is a cylindrical lens; however, other optical arrangements, such as lenses having hemispherical cross-sections or which correct both fast and slow axes, can also be used to advantage.

Lens 165 may be bonded directly to diode 155 at slit 160. In front of lens 165 is a sapphire window 168, which is carried at the end of a tubular cartridge 170, forming the end face thereof. Cartridge 170 is received within the interior cavity of housing 158, and is preferably bonded therein such that the exterior face of window 168 contacts (and may be bonded to) the flat face of cylindrical lens 165. Cartridge 170 and housing 158 are preferably metal.

Cartridge 170 includes a threaded stem 175 for receiving a fiber-optic cable 180 terminating in an SMA (or similar, e.g., ST or FC) connector package 182, which includes a threaded collar 184 that is free to rotate. Cable 180 emerges within collar 184 and protrudes beyond the collar, terminating in an end face 180*f*. (The optical fiber resides within cable 180 and is indicate by the dashed line.) The length of stem 175 is chosen such that, with collar 184 fully threaded thereover, the end face 180*f* of cable 180 makes contact with the interior face of sapphire window 168. Accordingly, if diode 155 fails, its removal need not disturb the optical cabling assembly. Instead, this is simply removed by detaching connector 182, and the diode structure replaced.

Figure 4:
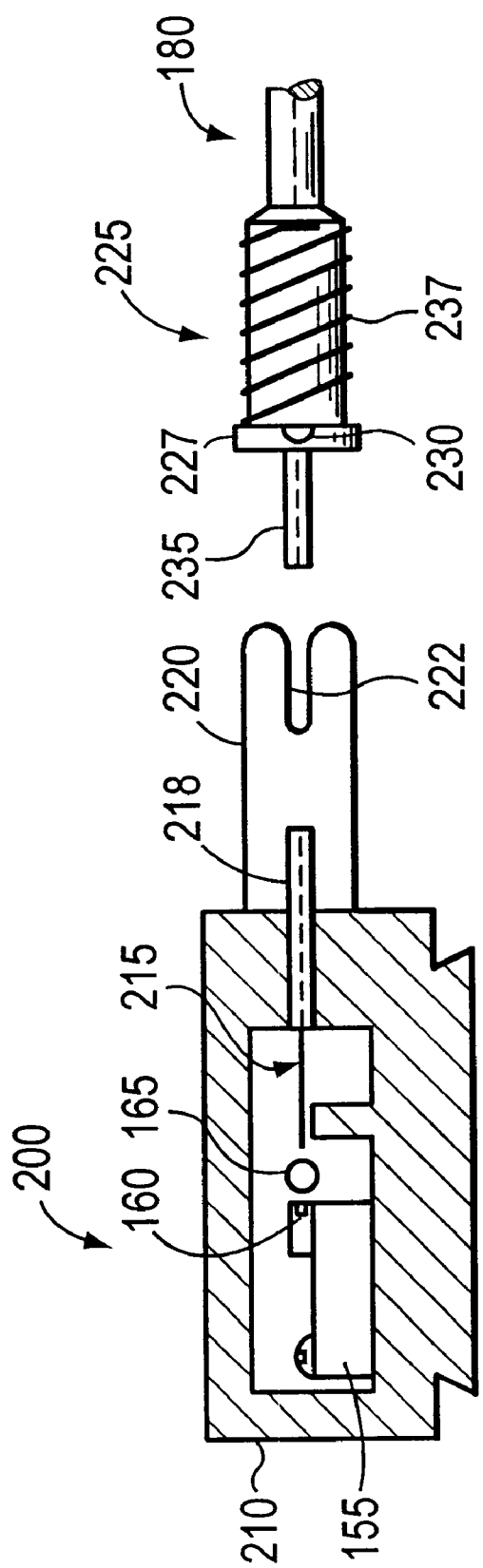
FIG. 4 is a sectional view of a second structure for removably coupling an optical fiber to a laser pumping diode, with the fiber removed from the structure.

FIG. 4 illustrates a second mounting structure facilitating removable coupling of any of laser diodes $D_1$–$D_4$ to its respective fiber $72_1$–$72_4$ (see FIG. 1). Once again, the illustrated structure, indicated generally at 200, guides the output of a laser diode 155 into the end face of an optical fiber without the need for permanent affixation thereto. Mounting structure 200 includes a housing 210 having an interior cavity for receiving the diode package 155, which is permanently affixed therein. Housing 200 contains suitable openings, not shown, that facilitate electrical connection to diode 155.

The emission slit 160 of diode 155 is again directed through a divergence-reduction lens 165, which may be a cylindrical lens. Lens 165 is bonded to a length 215 of optical fiber, which exits housing 210 through a ceramic sleeve 218 encased within housing 210. Projecting from housing 210 and concentric with sleeve 218 is a tubular stem 220 having one or more guide slots or channels 222 therein. The fiber-optic cable 180 terminates in a connector 225 having a rimmed or flanged end 227 whose diameter approximately matches the interior diameter of stem 220 (so as to permit connector 225 to be conveniently received within stem 220). A pin 230 projects radially from flange 227 and fits within guide slot 222 as connector 225 travels axially within stem 220. The optical fiber carried within cable 180 emerges from connector 225 through a ceramic sleeve 235, which is encased within connector 225.

The depth of guide slot 222 is chosen such that, before pin 230 reaches the terminus of the slot, the end face of ceramic sleeve 235 makes mechanical contact with the end face of sleeve 218, thereby aligning optical fiber 215 with the optical fiber carried within cable 180. One or both end faces may be coated with an index-matching fluid (e.g., a cis-trans mixture of decahydronaphthalene) to ensure proper light transmission through the junction.

In order to ensure maintenance of mechanical contact between the end faces of sleeves 218, 235 notwithstanding the vibrational rigors of a commercial printing environment, connector 225 may be provided with a spring 237, one end of which butts against flange 227. The other end of spring 237 is engaged by a mechanical member (not shown) that is urged toward the mounting structure 200. The resulting axial force transmitted to flange 227, the magnitude of which is determined by the spring constant of spring 237, maintains contact between the end faces of sleeves 218, 235. The spring constant of spring 237 is chosen so as to ensure reliable contact without damage to sleeves 218, 235 or, more likely, skew or shifting of the end faces.

It will therefore be seen that we have developed new and useful approaches to the design and operation of multiple-beam, diode-pumped laser systems applicable to a variety of digital-imaging environments. The terms and expressions employed herein are used as terms of description and not of limitation, and there is no intention, in the use of such terms and expressions, of excluding any equivalents of the features shown and described or portions thereof, but it is recognized that various modifications.are possible within the scope of the invention claimed.

What is claimed is:

1. A laser diode package facilitating removable coupling of an optical fiber to the diode, the package comprising:
   a. a laser diode;
   b. a microlens associated with the laser diode;
   c. a sapphire window having first and second sides, the first side being associated with the microlens; and
   d. means for removably receiving the optical fiber such that an end face of the optical fiber makes contact with the second side of the sapphire window, a continuous light path extending, with the fiber thus received, from the laser diode to the end face of the fiber.

2. The package of claim 1 wherein the optical fiber is carried in a connector comprising a threaded sleeve coaxially surrounding the fiber, the means for removably receiving the optical fiber comprising:
   a. a tubular stem having exterior threads for receiving the sleeve and a bore for receiving the fiber therethrough;
   b. a rear wall comprising the sapphire window, the rear wall being spaced from the stem such that, with the sleeve received on the exterior threads of the stem, the end face of the fiber makes contact with the second side of the sapphire window.

* * * * *